US008462471B2

(12) United States Patent
Huang et al.

(10) Patent No.: US 8,462,471 B2
(45) Date of Patent: Jun. 11, 2013

(54) CIRCUIT INTERRUPTING DEVICE WITH HIGH VOLTAGE SURGE PROTECTION

(75) Inventors: Huadao Huang, Yueqing (CN); Huayang Lu, Jiangqiao Town (CN)

(73) Assignee: Huadao Huang, Yueqing (CN)

( * ) Notice: Subject to any disclaimer, the term of this patent is extended or adjusted under 35 U.S.C. 154(b) by 727 days.

(21) Appl. No.: 12/591,419

(22) Filed: Nov. 19, 2009

(65) Prior Publication Data

US 2010/0073178 A1  Mar. 25, 2010

Related U.S. Application Data

(63) Continuation-in-part of application No. 12/000,530, filed on Dec. 13, 2007, now Pat. No. 7,940,498.

(30) Foreign Application Priority Data

Sep. 30, 2007 (CN) .................. 2007 2 0178406 U
Sep. 30, 2007 (CN) .................. 2007 2 0178406 U
Sep. 30, 2007 (CN) .................. 2007 2 0178407 U
Sep. 30, 2007 (CN) .................. 2007 2 0178407 U

(51) Int. Cl.
*H02H 3/16* (2006.01)
*H02H 9/08* (2006.01)

(52) U.S. Cl.
USPC ................ 361/42; 361/49; 361/45; 361/46

(58) Field of Classification Search
USPC ........................ 361/42, 49, 45, 46
See application file for complete search history.

(56) References Cited

U.S. PATENT DOCUMENTS

| 4,315,328 | A | | 2/1982 | Schwab |
| 4,386,338 | A | | 5/1983 | Doyle et al. |
| 4,518,945 | A | | 5/1985 | Doyle et al. |
| 4,595,894 | A | | 6/1986 | Doyle et al. |
| 4,831,496 | A | | 5/1989 | Brant et al. |
| 5,202,662 | A | | 4/1993 | Bienwald et al. |
| 5,424,896 | A | * | 6/1995 | Pasch et al. ............... 361/56 |
| 5,594,398 | A | | 1/1997 | Marcou et al. |
| 5,654,857 | A | | 8/1997 | Gershen |
| 5,680,287 | A | | 10/1997 | Gernhard et al. |
| 5,963,408 | A | | 10/1999 | Neiger et al. |
| 6,040,967 | A | | 3/2000 | DiSalvo |
| 6,052,265 | A | | 4/2000 | Zaretsky et al. |
| 6,111,733 | A | | 8/2000 | Neiger et al. |
| 6,226,161 | B1 | | 5/2001 | Neiger et al. |

(Continued)

FOREIGN PATENT DOCUMENTS

DE  EP000210547  *  2/1987

*Primary Examiner* — Rexford Barnie
*Assistant Examiner* — Zeev V Kitov
(74) *Attorney, Agent, or Firm* — Mei & Mark LLP

(57) ABSTRACT

The present invention provides a circuit interrupting device which comprises a leakage current detection and protection circuit containing a simulated leakage current generation circuit which is capable of automatically generating a simulated leakage current when the circuit interrupting device is properly wired and in a tripped state to automatically test the functions of the key components of the circuit interrupting device. The simulated leakage current generation circuit comprises a normally closed switch and a normally open switch. The leakage current detection and protection circuit further comprises a normal status indicator light and a power output indicator light to indicate whether the circuit interrupting device is working properly and/or reverse wired. The circuit interrupting device further comprises a reset switch, a pair of discharged metal pieces, and four pairs of circuit interrupting contacts.

28 Claims, 9 Drawing Sheets

U.S. PATENT DOCUMENTS

| | | |
|---|---|---|
| 6,246,558 B1 | 6/2001 | DiSalvo et al. |
| 6,252,407 B1 | 6/2001 | Gershen |
| 6,282,070 B1 | 8/2001 | Ziegler et al. |
| 6,288,882 B1 | 9/2001 | DiSalvo et al. |
| 6,309,248 B1 | 10/2001 | King |
| 6,381,112 B1 | 4/2002 | DiSalvo |
| 6,437,953 B2 | 8/2002 | DiSalvo et al. |
| 6,469,881 B2 | 10/2002 | Gershen et al. |
| 6,580,344 B2 | 6/2003 | Li |
| 6,671,145 B2 | 12/2003 | Germain et al. |
| 6,861,595 B2 * | 3/2005 | Passow ............. 200/16 R |
| 6,864,766 B2 | 3/2005 | DiSalvo et al. |
| 6,900,972 B1 * | 5/2005 | Chan et al. ............ 361/111 |
| 6,952,150 B2 | 10/2005 | Radosavljevic et al. |
| 6,958,895 B1 | 10/2005 | Radosavljevic et al. |
| 6,963,260 B2 | 11/2005 | Germain et al. |
| 7,019,952 B2 | 3/2006 | Huang et al. |
| 7,049,910 B2 | 5/2006 | Campolo et al. |
| 7,049,911 B2 | 5/2006 | Germain et al. |
| 7,068,481 B2 | 6/2006 | Radosavljevic et al. |
| 7,082,021 B2 | 7/2006 | Chan et al. |
| 7,154,718 B1 | 12/2006 | Finlay, Sr. et al. |
| 7,212,386 B1 | 5/2007 | Finlay, Sr. et al. |
| 7,283,340 B1 | 10/2007 | Finlay, Sr. et al. |
| 7,633,736 B2 * | 12/2009 | Domitrovich et al. ...... 361/115 |

* cited by examiner

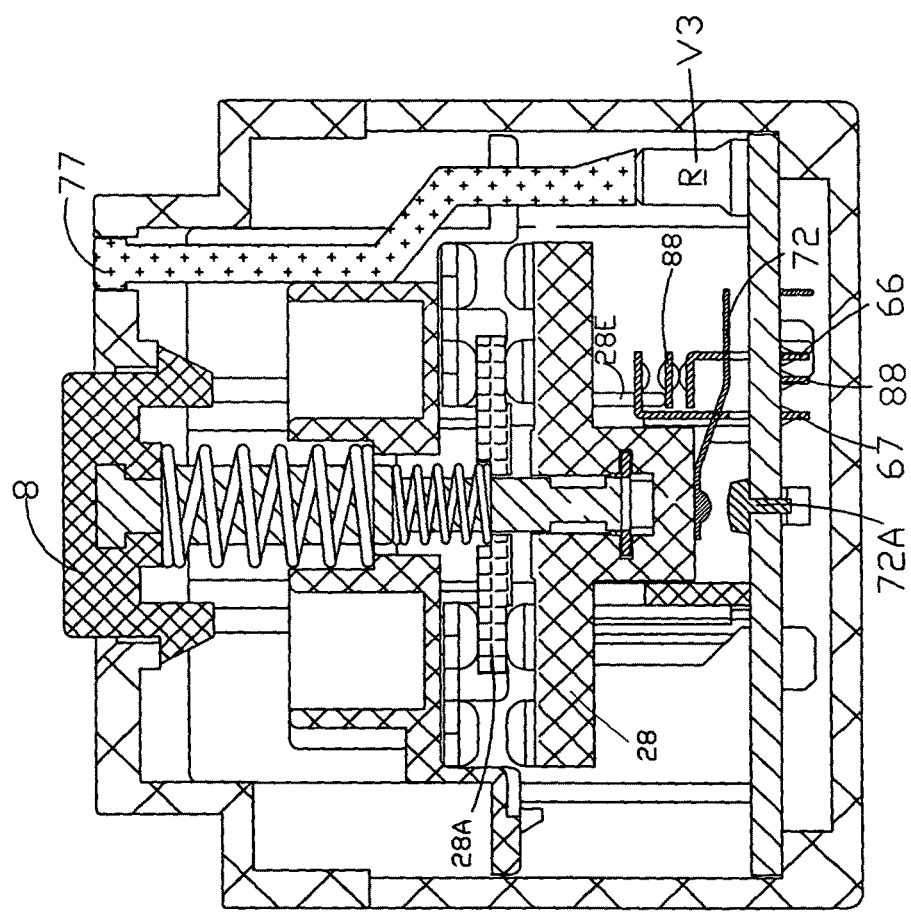

CIRCUIT INTERRUPTING DEVICE WITH HIGH VOLTAGE SURGE PROTECTION

RELATED APPLICATION

The present application is a Continuation-In-Part of and claims the priority of U.S. patent application Ser. No. 12/000, 530, filed on Dec. 13, 2007; which in turn claims the priority of Chinese patent application Nos. 200720178404.5, 200720178405.X, 200720178407.9 and 200720178406.4, all filed on Sep. 30, 2007, the contents of which are herein incorporated by reference.

FIELD OF THE INVENTION

The present invention relates to a circuit interrupting device which comprises a leakage current detection and protection circuit containing a simulated leakage current generation circuit which is capable of automatically generating a simulated leakage current when the circuit interrupting device is properly wired and in a tripped state to automatically test the functions of the key components of the circuit interrupting device. The simulated leakage current generation circuit comprises a normally closed switch and a normally open switch. The leakage current detection and protection circuit further comprises a normal status indicator light and a power output indicator light to indicate whether the circuit interrupting device is working properly and/or reverse wired. The circuit interrupting device further comprises a reset switch, a pair of discharged metal pieces, and four pairs of circuit interrupting contacts.

BACKGROUND OF THE INVENTION

Due to increasingly higher demands for safety of ground fault circuit interrupters (GFCIs), it is desirable to provide safety measures for the GFCIs to allow an end user to find out whether the components of the GFCIs are working properly, whether the GFCIs are properly wired, and whether there is power to the output load. Additionally, it is desirable to extend the life span of the GFCIs by designing a feature that can protect the GFCIs from high voltage surge, such as lightning. The invention described below is designed to encompass the safety functions set forth above.

SUMMARY OF THE INVENTION

The present invention provides a circuit interrupting device which has an input power terminal which is coupled to an input power source, an output power terminal which is coupled to an output load, and a user accessible load end which is electrically coupled to a user accessible load socket. The circuit interrupting device comprising a leakage current detection and protection circuit, which comprises a simulated leakage current generation circuit capable of automatically generating a simulated leakage current when the circuit interrupting device is properly wired.

The simulated leakage current generation circuit is coupled to a reset button and comprises a simulated leakage current generation switch, a current-limiting resistor and a solenoid coil. The simulated leakage current generation switch comprises a normally closed switch and a normally open switch, each containing a conductive metal piece and sharing a common contact piece. The common contact piece is coupled to a hot line or a neutral line of the input power terminal via the solenoid coil. The conductive metal piece of the normally closed switch is coupled to the hot line or the neutral line of the input power terminal through the differential transformers via the current-limiting resistor. The conductive metal piece of the normally open switch is coupled to the neutral line or the hot line of the input power terminal via an anode of a silicon controlled rectifier (SCR).

If the circuit interrupting device is properly wired and in a trip state, the simulated leakage current generation circuit automatically generates the simulated leakage current through an operation of the normally closed switch. If the key components of the circuit interrupting device are working properly, a depression of the reset button allows the circuit interrupting device to reset. If at least one of the key components of the circuit interrupting device is damaged or not working properly, a depression of the reset button does not allow the circuit interrupting device to reset.

The common contact piece comprises an upper contact and a lower contact.

The key components of the circuit interrupting device comprise the differential transformers, the solenoid coil, the SCR, and a leakage current detection integrated chip (IC).

The leakage current detection and protection circuit further comprises a normal status indicator light and a power output indicator light. When the circuit interrupting device is properly wired and at a tripped state, before the reset button is depressed, if the key components of the circuit interrupting device are working properly, the normal status indicator light automatically lights up, but the power output indicator is not lit. If, at this time, a user depresses the reset button, the normal status indicator light continues to light, and the power output indicator is still not lit. Only when the user releases the reset button, the normal status indicator light is turned off, and the power output indicator light lights up.

If the circuit interrupting device is reverse wired, the normal status indicator light is not lit, but the power output indicator light lights up. Also, when the circuit interrupting device is reverse wired, the reset button cannot be depressed. Additionally, if the circuit interrupting device is wired (i.e., whether properly wired or reverse wired) and at a tripped state, if neither the normal indicator light nor the power output indicator light is lit, at least one of said components of said circuit interrupting device is damaged.

The power output indicator light is located below a light-guiding tube on a circuit board and is coupled to the hot and the neutral output power terminals. The light-guiding tube allows the power output indicator light to be shown at the user accessible load socket.

One end of the normal status indicator light is coupled to the anode of the SCR in the leakage detection and protection circuit and the other end of the normal status indicator light is coupled to the common contact piece via a resistor.

The circuit interrupting device further comprises a reset switch coupled to the reset button. The reset switch is normally open unless for a period when the reset button is depressed by a user.

One end of the reset switch is coupled to the hot line or the neutral line of the input power terminal via the solenoid coil. The other end of the reset switch is coupled to the anode of said SCR. The SCR further has a control electrode which is coupled to a leakage current detection integrated chip (IC) and a cathode which is coupled to the hot or the neutral line of the input power terminal via the solenoid coil. When the IC receives a signal from the differential transformers, it transmits the signal to the control electrode of the SCR, which relays the signal to the solenoid coil to activate the iron core within the solenoid coil to trip the circuit interrupting device.

When the circuit interrupting device is properly wired and in a tripped state, before the reset button is depressed, the normally closed switch is in a closed state while said normally open switch and said reset switch are in an open state. When the circuit interrupting device is properly wired and the reset button is depressed by a user, before the user releases the reset button, both the normally closed switch and said reset switch are in said closed state, while said normally open switch is in said open state. When the circuit interrupting device is properly wired and the depression of the reset button causes the circuit interrupting device to trip, before the user releases the reset button, only the normally open switch is in the open state, while the normally closed switch is in the closed stat and the reset switch is momentarily closed. When the circuit interrupting device is in a reset state waiting for tripping, the normally open switch is in the closed state, while both of the normally closed switch and the reset switch are in the open state.

The circuit interrupting device further comprises a pair of discharge metal pieces extended from a pair of input power connecting pieces, each being electrically connected to the hot or the neutral line of the input power terminal respectively. The discharge metal pieces are either right-angled triangular-shaped or isoceles triangular-shaped with sharp ends used for discharge. The sharp ends of the pair of the discharge metal pieces face, but do not contact with, each other. During a high voltage surge (such as lightning), the pair of said discharge metal pieces cause a discharge of electricity through said sharp ends of said discharge metal pieces to protect said circuit interrupting device from being damaged due to said high voltage surge. The sharp ends of the discharge metal pieces are placed symmetrically and kept at regular intervals, with the distance between the sharp ends of the discharge metal pieces about half of the distance between the bases of the discharge metal pieces. The pair of the input power connecting pieces and each of the pair of the discharge metal pieces have an angle greater than 90°.

The hot line of the input power terminal is operationally coupled to the neutral line of the input power terminal through a solenoid coil and a metal oxide varistor (MOV).

The circuit interrupting device further comprises a test switch coupled to a test button. A depression of the test button causes the test switch to close and manually generates a simulated leakage current to test whether the components of the circuit interrupting device are working properly. One end of the test switch is coupled to the hot or the neutral line of the input power terminal via a simulated leakage current-limiting resistor, and the other end of the test switch is coupled to a hot or a neutral wire of the output load terminal.

The circuit interrupting device further comprises four pairs of circuit interrupting contacts to connecting or disconnecting the input power source to or from the output load and the user accessible output socket. The four pairs of circuit interrupting contacts are coupled to the reset button.

When the circuit interrupting device is properly wired and the reset button is depressed but not released, the reset switch is closed, which activates the solenoid coil and allows an electric current flows from the hot line or neutral line of the input power terminal, through the solenoid coil, the reset switch, the anode of the SCR, and then flows back to the neutral line or the hot line of the input power terminal. At this time, the normally closed switch is in a closed state, the normally open switch is in an open state, the four pairs of circuit interrupting contacts are disconnected from each other, and the normal status indicator light lights up. When the reset button is depressed and released, the reset switch and the normally closed switch are in the open state, while the normally open switch and the four pairs of circuit interrupting contacts are in the closed state. At this time, a normal status indicator light is turned off, and the power output indicator light lights up.

The leakage current detection and protection circuit further comprises a timer chip. One end of the timer chip is coupled to the control electrode of the SCR, which outputs a periodic signal to trip the circuit interrupting device. When the circuit interrupting device is tripped by the timer chip and the components of the circuit interrupting device are working properly, the normal status indicator light is automatically lit but a power output indicator light on the user accessible output socket is off, indicating that the circuit interrupting device has no power output. At this time, a user needs to depress the reset button to reset the circuit interrupting device. When the circuit interrupting device is reset, the normal status indicator light is off and the power output indicator light is lit.

The normally open switch and the normally closed switch are stacked on each other with the normally open switch below the normally closed switch. The conductive metal piece of the normally closed switch is located at the bottom, the common contact piece is located in the middle and shared by both the normally open switch and the normally closed switch. The conductive metal piece of the normally closed switch is located at the top. The normally closed switch and normally open switch are situated close to a tripping mechanism, which is located underneath the reset button and has a through hole to receive a direction lock of the reset button.

The tripping mechanism comprises a reset support piece and a tripping device, with the reset support piece situated above the tripping device. The reset support piece has a touch pin which is capable of being extended downward to touch the common contact piece of the normally closed switch and the normally open switch. When the reset button is depressed, the touch pin of the reset support piece moves downward with the reset button to rest on the common contact piece to allow the common contact piece to be in touch with the conductive metal piece of the normally closed switch to maintain the normally closed switch at the closed state. When the reset button is in the reset state, the touch pin of the reset support moves upward to separate from the common contact piece to allow said common contact piece to be in contact with the conductive metal piece of the normally open switch so as to close the normally open switch.

The circuit interrupting device is preferably a ground fault circuit interrupter.

BRIEF DESCRIPTION OF THE DRAWINGS

FIG. 3 is a partial cross-section of the internal structure diagram of the circuit interrupting device, which contains a leakage current detection and protection circuit. Shown in this diagram is the position of the simulated leakage current generation switch and the reset switch of the circuit interrupter within the circuit interrupting device when the reset button is in a trip state.

FIGS. 7-1, 7-2 and 7-3 are the schematic diagrams of positions and structure of the discharge metal pieces installed in the input power terminal of the leakage current detection and protection circuit of the circuit interrupting device.

DETAILED DESCRIPTION OF THE INVENTION

Figure 1:
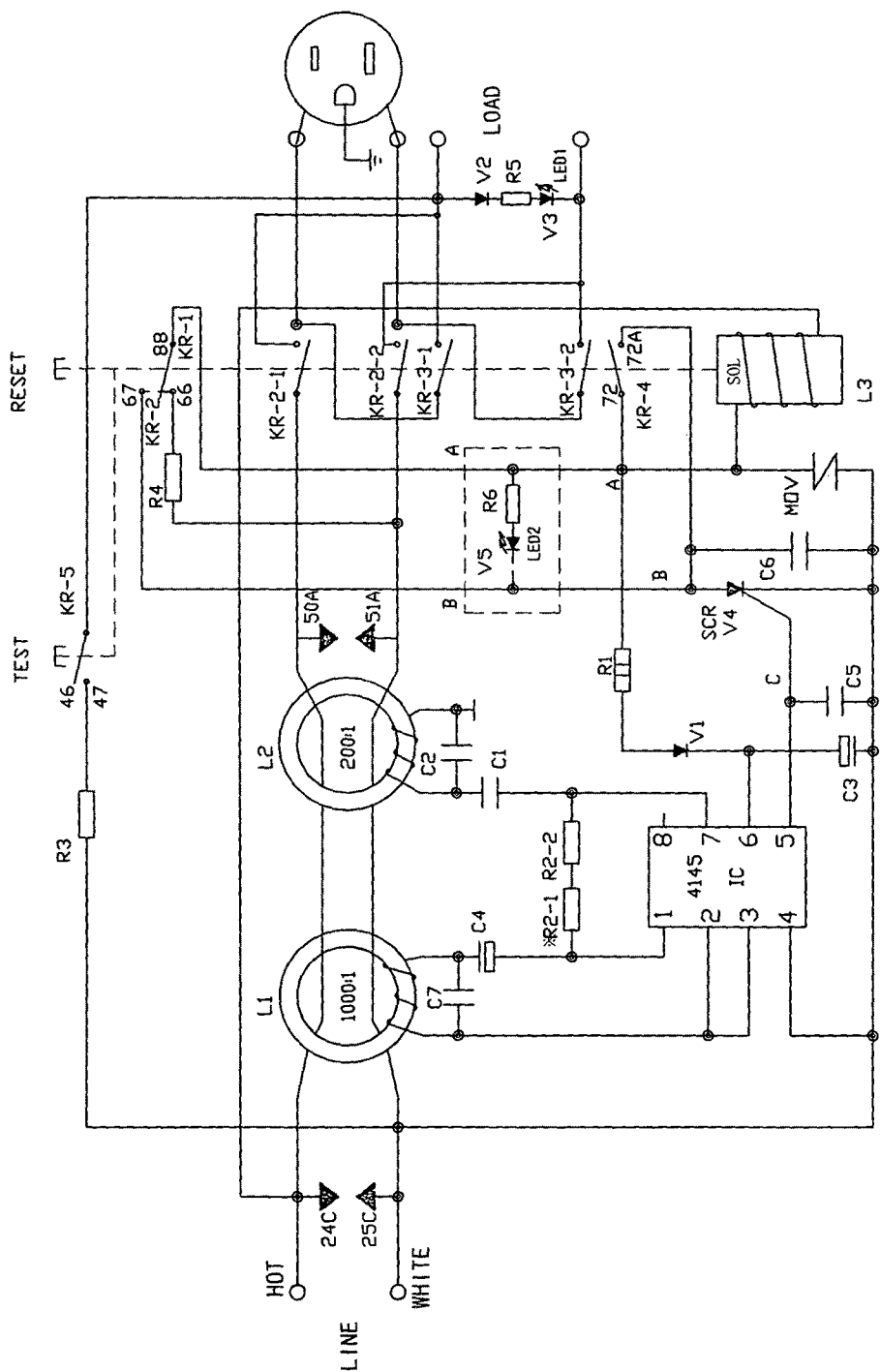
FIG. 1 is a circuit diagram of one embodiment of the leakage current detection and protection circuit of a circuit interrupting device (such as a ground fault circuit interrupter [GFCI]), which contains the end-of-life detection and light display functions.

FIG. 1 is the circuit diagram of a preferred embodiment of the leakage current detection and protection circuit in a circuit interrupting device, preferably a ground fault circuit interrupter (GFCI). The leakage current detection and protective circuit is distinctively different from any conventional circuitry in a GFCI for at least the following three reasons: (1) The leakage current detection and protective circuit of the present invention contains a simulated leakage current generation circuit which automatically generates a simulated leakage current to test the functions of the components in the circuit interrupting device (i.e., the end-of-the-life test) when the device is properly wired and at a tripped state; (2) the circuit interrupting device contains a pair of discharged metal pieces to provide protection against the damage from high surge such as lightning; and (3) the circuit interrupting device has reverse wiring detection capability.

As shown in FIG. 1, the leakage current detection and protection circuit of the present invention contains the following components: (1) differential transformers L1 (1000:1) and L2 (200:1), which are used for detecting a leakage current; (2) a leakage current detection integrated chip (IC), such as RV4145 manufactured and sold by Fairchild Semiconductor, which is a low power controller for AC outlet ground fault interrupters that can detect hazardous grounding conditions; (3) solenoid coil L3 (SOL) with built-in iron core, which is a loop of wire wrapped around an iron core to produce a magnetic field when an electric current is passed through it; (4) silicon controlled Rectifier (SCR), which is a solid state device, i.e., a type of thyristor, that controls current; (5) a simulated leakage current generation circuit, which contains a normally closed switch (KR-1) and a normally open switch (KR-2) to control the generation of a simulated leakage current to test the functions of at least the components in (1)-(4); (6) a reset switch (KR-4), which controls the reset of the circuit interrupting device; (7) four pairs of circuit interrupting contacts, i.e., KR-2-1, KR-2-2, KR-3-1 and KR-3-2, which control the establishment and discontinuation of the electrical connection between the input power terminal, the output power terminal (LOAD), and the user accessible output terminal (power socket); (8) a normal status indicator light (V5) and a power output indicator light (V3), which display the "end-of-life" satisfactory result (i.e., the normal status indicator light V5), and whether there is power output (i.e., the power output indicator light V3); and (9) others, such as current-limiting resistors, diodes, capacitors etc. Components (5). It is noted that the simulated leakage current generation circuit, the reset switch, and the four pairs of circuit interrupting contacts are coupled to and operated with the movement of the reset button (RESET).

In the leakage current detection and protection circuit, hot line HOT and neutral line NEUTRAL of the input power terminal LINE pass through differential transformers L1 and L2, to be connected to hot load wire HOT or neutral load wire NEUTRAL of the output power terminal via the two pairs of circuit interrupting contacts KR-2-1 and KR-2-2 coupled to reset button RESET. At the same time, the plug blades of hot output wire HOT and neutral output wire NEUTRAL in the plug blades slots of the three-prong power socket on the surface of the output socket are connected to hot load wire HOT and neutral load wire NEUTRAL of output power terminal LOAD of the leakage current detection and protection circuit via another group of circuit interrupting contacts KR-3-1 and KR-3-2 coupled to and moved with reset button RESET.

The output ends of the fault signal from the differential transformers L1 and L2 are connected to the signal input pins 1, 2, 3 and 7 of the leakage current detection integrated chip (IC). The control signal output pin 5 of the IC is connected to the control electrode of SCR V4. The power supply input pin 6 of the IC is connected to hot line HOT or neutral line NEUTRAL of input power terminal LINE of the circuit interrupting device via diode V1, resistor R1 and solenoid coil (SOL) L3. Alternatively, the power supply input pin 6 of the IC is connected to hot line HOT or neutral line NEUTRAL of input power terminal LINE of the circuit interrupting device via resistor R1, diode V1 and solenoid coil L3. The grounding pin 4 of the IC is connected to neutral line NEUTRAL or hot line HOT of the input power terminal LINE of the circuit interrupting device.

The cathode of SCR V4 is connected to neutral line NEUTRAL or hot line HOT of input power terminal LINE of the circuit interrupting device, and the anode of SCR V4 is connected to hot line HOT or neutral line NEUTRAL of input power terminal via the normally open reset switch KR-4 and the solenoid coil L3, which are both coupled to reset button RESET. At the same time, the anode of SCR V4 is connected to hot line HOT or neutral line NEUTRAL of the input power terminal via the normally open switch KR-2 and solenoid coil L3 of the simulated leakage current generation circuit. The simulated leakage current generation circuit contains a normally closed switch KR-1 and a normally open switch KR-2. The normally closed switch KR-1 and the normally open switch KR-2 share a common contact point A that is connected to hot line HOT of the input power terminal LINE of the circuit interrupting device via solenoid coil L3. The other unshared line of normally closed switch KR-1 is connected to neutral line NEUTRAL of differential transformers L1 and L2 via a current-limiting resistor R4 of the simulated leakage current generation circuit. The other unshared line of the normally open switch KR-2 is connected to the anode of SCR V4.

Figure 6:
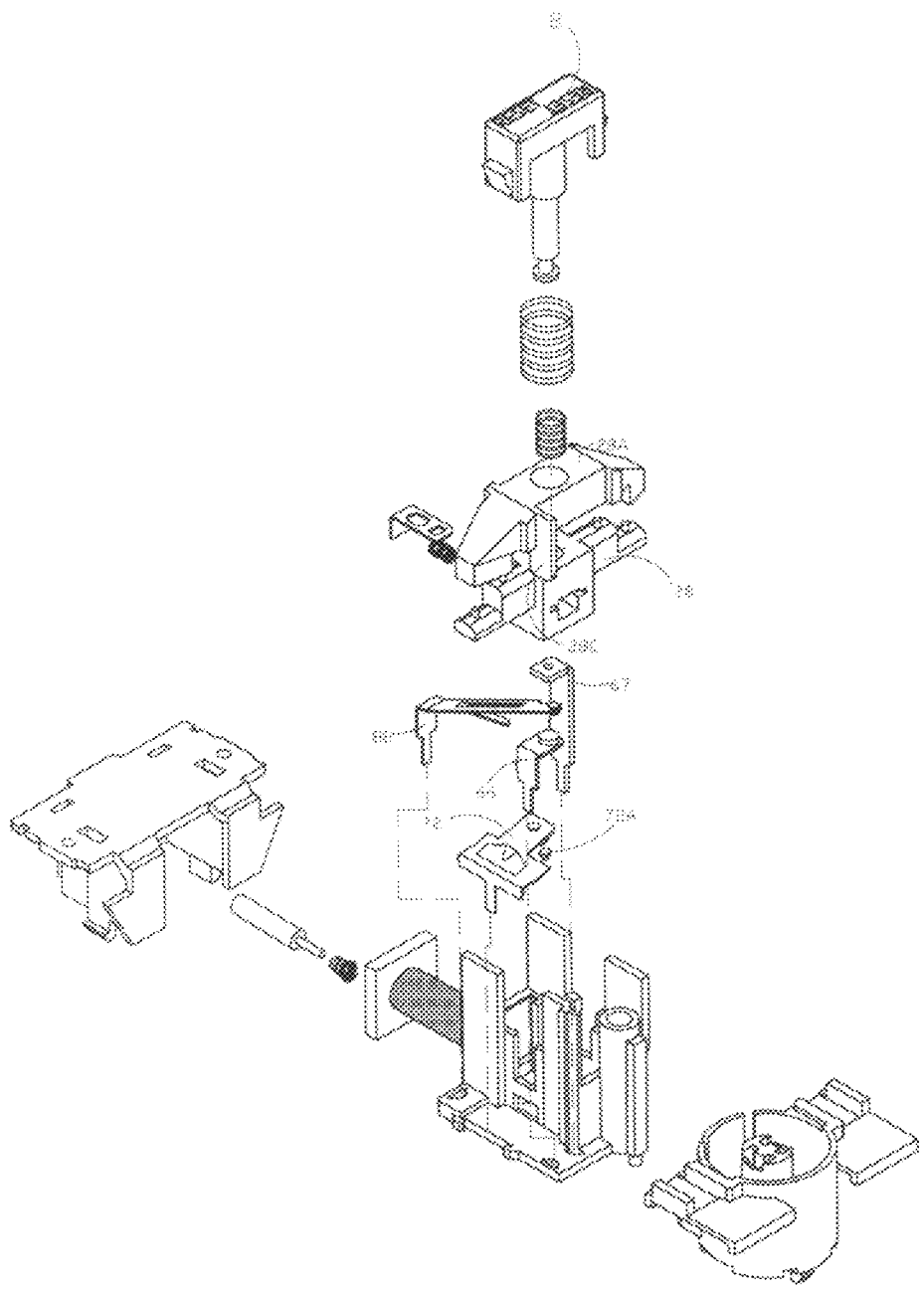
FIG. 6 is an exploded cubic schematic of the structure diagram of the reset/trip mechanical construction of the circuit interrupting device.

The solenoid coil L3, including the built-in iron core, allows the circuit interrupting device to reset or trip through a reset/trip mechanism that is coupled to the reset button RESET (as shown in FIG. 6). This further closes or opens the four pairs of circuit interrupting contacts KR-2-1, KR-2-2, KR-3-1 and KR-3-2, switches on/off of the normally closed switch and switches off/on of the normally open switch. The four pairs of circuit interrupting contacts KR-2-1, KR-2-2, KR-3-1 and KR-3-2, and the normally closed switch and the normally open switch of the simulated leakage current generation circuit are all coupled to and interacted with reset button RESET.

There is a power output indicator light LED1 (V) connected between the hot load wire HOT and neutral load wire of the output power terminal LOAD of the circuit interrupting device, showing whether there is power output in the circuit interrupting device. If there is power output in the circuit interrupting device, the power output indicator light LED1 (V3) will light up. If there is no power output, the power output indicator light LED1 (V3) will not be lit.

There is a normal status indicator light LED2 (V5) showing whether the circuit interrupting device has passed the "end-of-service-life" test. If the key components in the leakage current detection and protection circuit are working properly, the normal status indicator light LED2 (V5) will light up. If not, the normal status indicator light LED2 (V5) will not be lit. The normal status indicator light LED2 (V5) is connected between Point B and Point A of the simulated leakage current generation circuit. As shown above, Point A is the shared common contact point of both the normally closed switch KR-1 and normally open switch KR-2 of the simulated leakage current generation circuit. Point B connects to the anode of SCR V4. If the circuit interrupting device is properly wired, because the circuit interrupting device is coming out of the factory in the tripped position, the normally closed switch KR-2 (66, 88) is in the closed state. The normally closed switch KR-1 (66, 88) is in the closed state. The automatically generated simulated leakage current flows from the hot line HOT of the input power terminal LINE to pass through solenoid coil L3 (SOL), Point A, the contact 88 and the contact 66 on the normally closed switch KR-1, the current-limiting resistor R4, differential transformers L1 and L2 and then flows back to the neutral line NEUTRAL of the input power terminal LINE to complete a loop.

If the leakage current detection and protection circuit works normally and the components of the leakage current detection and protection circuit, such as SCR V4, solenoid coil L3, differential transformers L1 and L2, leakage current detection integrated chip IC, are under good condition and normal conduction, the SCR V4 will be conductive through Line B. With the normal conduction of SCR V4, the normal status indicator light LED2 (V5) will light up, showing the satisfactory completion of the end-of-life test, which indicates that the circuit interrupting device has the leakage current protection. On the contrary, if the leakage current detection and protection circuit fails to work normally due to the failure of any of the components such as SCR V4, solenoid coil L3, differential transformers L1 and L2 and leakage current detection integrated chip IC, and leads to the end of life of the leakage current detection and protection circuit, the circuit interrupting device loses its leakage current protection function, the leakage current detection and protection circuit will fail to form a loop, so that the normal status indicator light LED2 (V5) will not light up, indicating that the service life of the circuit interrupting device has come to an end to remind the users to replace the circuit interrupting device.

Figure 4:
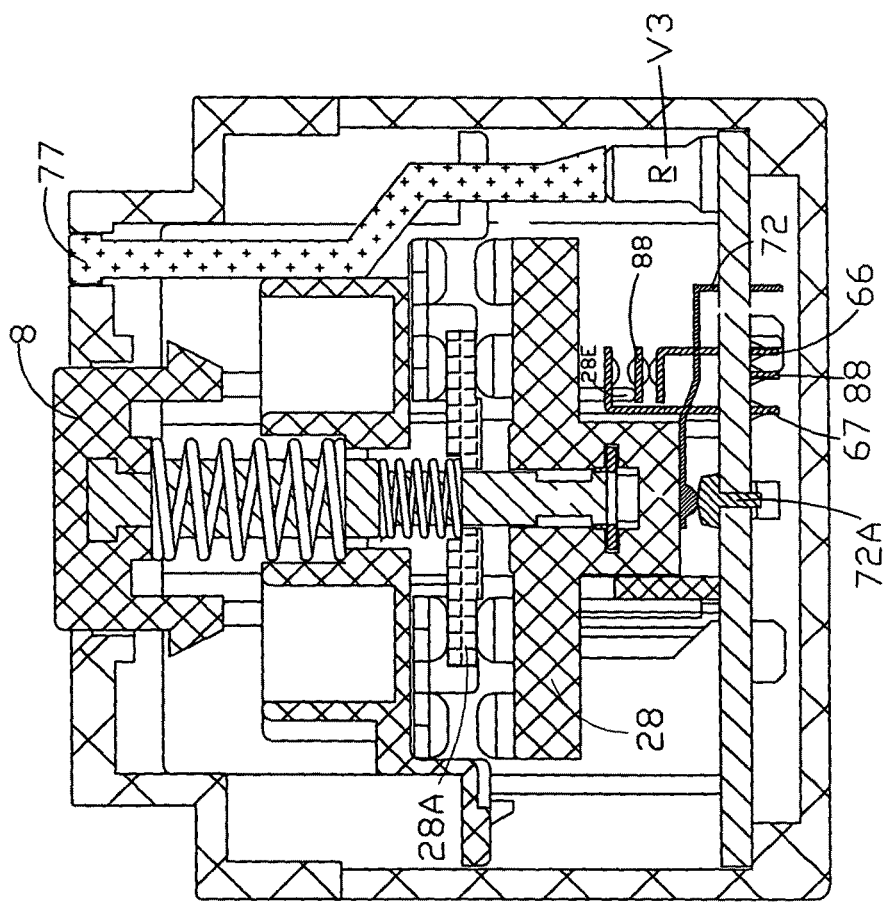
FIG. 4 is a partial cross-section of the internal structure diagram of the circuit interrupting device, which contains a leakage current detection and protection circuit. Shown in this diagram is the position of the simulated leakage current generation switch and the reset switch of the circuit interrupter within the circuit interrupting device when the reset button is depressed.
Figure 5:
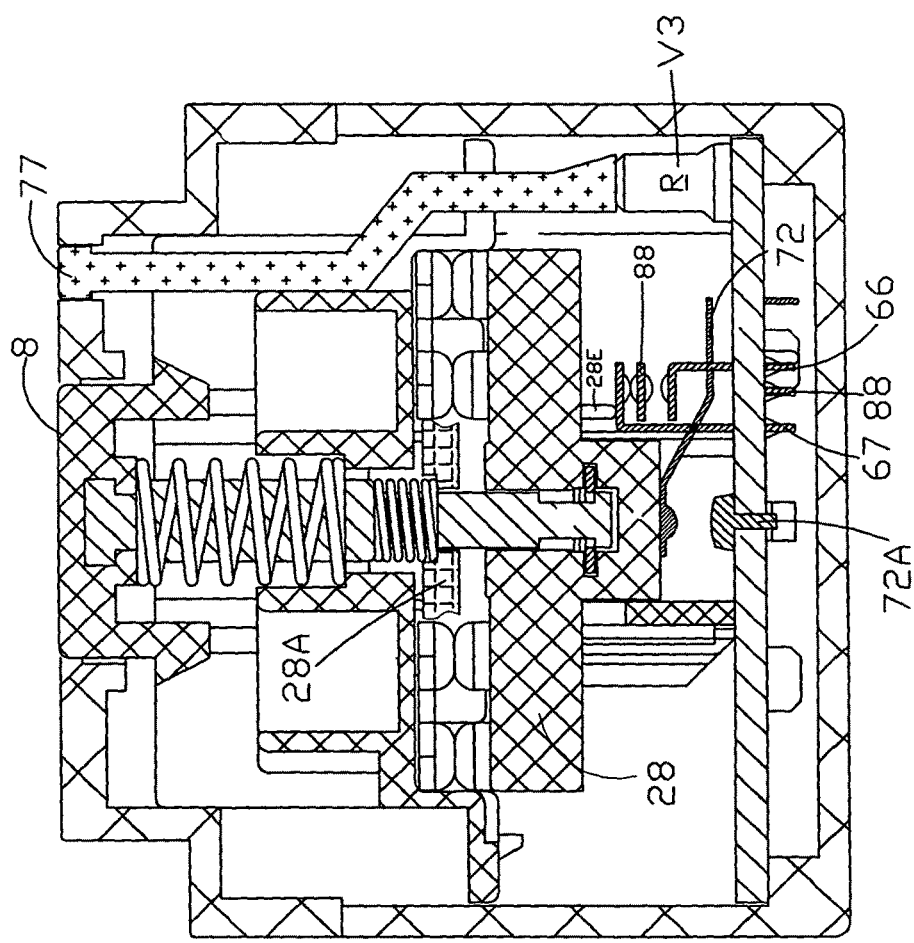
FIG. 5 is a partial cross-section of the internal structure diagram of the circuit interrupting device, which contains a leakage current detection and protection circuit. Shown in this diagram is the position of the simulated leakage current generation switch and the reset switch of the circuit interrupter within the circuit interrupting device when the device is in the reset state.
Figures 1, 7:
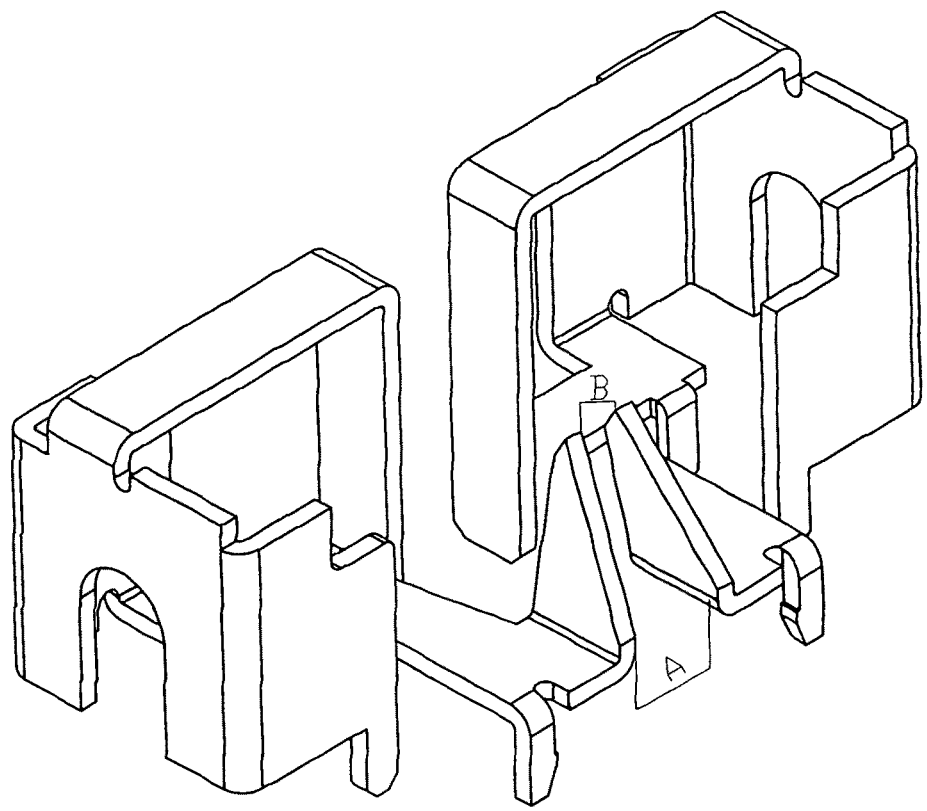
Figures 2, 7:
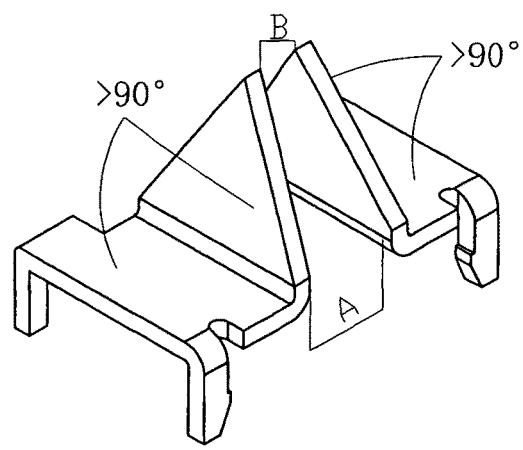
Figures 3, 7:
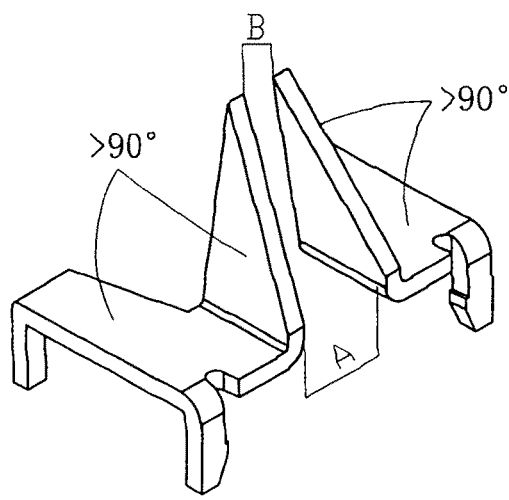

As shown in FIGS. 3, 4 and 5, the power output indicator light LED1 (V3) and the normal status indicator light LED2 (V5) are positioned on the circuit board below the light-guiding tube 77. Light-guiding tube 77 is responsible for guiding the light to the surface of the user accessible outlet socket.

As shown in FIG. 1, the neutral line NEUTRAL of the input power terminal LINE completes a loop by connecting to the hot line HOT of the input power terminal via the current-limiting resistor R4 and the normally closed switch KR-1 of the simulation leakage current generation circuit and the solenoid coil L3 (SOL). By doing so due to the design of the normally closed switch, it automatically generates a simulated leakage current without operating any part of the circuit interrupting device. After the input power terminal LINE of the circuit interrupting device is properly connected to the power source in the wall and the reset button RESET is at the tripped position (i.e., the circuit interrupting device is in the initial state and the reset button RESET has not been depressed), a simulated leakage current is automatically generated by passing the current through the current-limiting resistor R4 connected to the conductive metal pieces 66, 88 of the normally closed switch KR-1. At this time, if the leakage current detection and protection circuit works normally, the simulated leakage current flows through the differential transformers L1 and L2, which outputs a signal to leakage current detection integrated chip IC, which in turn outputs a high level control signal via pin 5 of leakage current detection integrated chip IC to the control electrode of the SCR V4. At this moment, if the user depresses the reset button RESET, the normally open reset switch KR-4 will be closed (i.e., turned on), and the SCR V4 will become conductive, which in turn will activate the solenoid coil L3 to generate a magnetic field. The solenoid coil L3, through its built-in iron core, will interact with the reset/trip mechanism as shown in FIG. 6. At this time, if the user releases the reset button, the reset button RESET will be at the reset position. The normally open switch KR-2 of the simulated leakage current generation circuit will be closed, the normally closed switch KR-1 will be opened, the simulated leakage current will disappear and the normal status indicator light LED2 V5 will be off, demonstrating that the circuit interrupting device is under good condition and possesses the leakage current protection function.

On the contrary, if the leakage current detection and protection circuit fails to work normally and the service life of the circuit interrupting device comes to an end, the SCR V4 will not conduct so that the solenoid coil L3 cannot be activated, which follows that the magnetic field cannot be generated and the internal iron core of the solenoid coil L3 cannot interact with the reset/trip mechanism. As a result, as shown in FIG. 6, the reset/trip mechanism cannot interact with the reset button RESET to reset, and the normal status indicator light V5 never lights up. In this circumstance, the power output indicator light LED1 V3 is never lit either because there is never any power output. This will remind the users that the circuit interrupting device has come to an end of its service life and the circuit interrupting device should be replaced by a good one.

When the reset button RESET is depressed and the normally closed switch KR-1 (66, 88) of the simulated leakage current generation circuit is still not disconnected, the contacts (72, 72A) on reset switch KR-4 are closed because the reset switch KR-4 is coupled to and moves with the reset button RESET. At the moment, point A and point B are shorted. The voltage between Point A and Point B is added to the solenoid coil L3, which allows the solenoid coil L3 to generate a magnetic field and allows the internal iron core to impact the reset/trip mechanism and trip the circuit interrupting device. This will allow the circuit interrupting device to reset. At this time, because the simulated leakage current disappears, the voltage on LED2 V5 between point A and point B is cut-off, the normal status indicator light V5 is turned off. At the same time, due to reset, the contacts 66, 88 on the normally closed switch KR-1 in the simulation leakage current switch are separated because the normally closed switch KR-1 moves with the reset button RESET. After the reset, the four pairs of circuit interrupting contacts KR-2, KR-2-1, KR-2-2, KR-3-1, and KR-3-2 are mates with each other due to the movement of the reset button RESET, which establish the electrical continuity between the input source, the output load, and the user accessible output socket. At this time, the power output indicator light LED1 V3 lights up, showing that there is power output in both the user accessible output socket and the output load.

If the circuit interrupting device is in good condition and is connected to power source correctly, the depression of the reset button RESET allows power output to the load end LOAD and to the surface of the user accessible output socket. During this normal operation, if there is a fault generated in the lines which creates an current imbalance between the hot line HOT and the neutral line NEUTRAL, the differential transformers L1 and L2 will sense the imbalance, and output a voltage signal with a certain value to an input pin of the IC, which in turn will output a control signal via pin 5 of the IC to the control electrode of SCR V4. After the SCR V4 becomes conductive, Point B at the anode of SCR V4 becomes low potential. Because during normal operation, the normally open switch KR-2 is in a closed state, Point A and Point B becomes the same. Also, because one end of the solenoid coil L3 is connected to SCR V4, the other end of the solenoid coil L3 is connected to hot line HOT of the power source, both ends of the solenoid coil L3 obtains a certain voltage which is sufficient to allow the electric current to flow through it, so that a magnetic field is generated to move the internal iron core to plunge onto the reset/trip mechanism to trip the circuit interrupting device. As a result of the tripping, the power supply to the load is cut off, and the two contacts 67, 88 on the normally open switch KR-2 of the simulated leakage current generation switch turns from the closed state to the open state. The contacts 66, 88 on the normally open switch KR-1 turns from the open state to the closed state. The four pairs of circuit interrupting contacts KR-2, KR-2-1, KR-2-2, KR-3-1, and KR-3-2 are separated from each other. At this time, the power output indicator light V3 is turned off. If the circuit interrupting device is not damaged due to the ground fault, the normal status indicator light V5 lights up.

As shown in FIGS. 3 and 6, the normally close switch KR-1 and normally open switch KR-2 are located near to the reset/trip mechanism 28, which is coupled to and interacts with reset button RESET 8. The normally close switch KR-1 contains a conductive metal piece 66 and a common metal piece 88 shared by both the normally closed switch KR-1 and the normally open switch KR-2. The normally open switch KR-2 contains a conductive metal piece 67 and the common metal piece 88. The conductive metal piece 66 of the normally closed switch is at the bottom and the common metal piece 88 is in the middle and the conductive metal piece 67 of the normally open switch is at the top. The reset separation piece 28A has a touch pin 28E extended downward, which rests on the common metal piece 88 in the middle and allows the common metal piece 88 to be in contact with the conductive metal piece 66 at the bottom to form the normally closed switchs KR-1; or in contact with the conductive metal piece 67 is at the top to form the normally open switch KR-2. The common metal piece 88 has two contacts, one on the top and the other at the bottom of the common metal piece.

As shown in FIG. 3, when the reset button RESET 8 is in the trip state, the conductive metal piece 66 is at the bottom, which forms the normally closed switch KR-1 by contacting with the common metal piece 88 in the middle. At the tripped state, the common metal piece 88 in the middle disconnects with the conductive metal piece 67 at the top, forming the normally open switch KR-2 in the simulated leakage current generation circuit. As shown in FIG. 4, when the reset button RESET 8 is depressed, the normally closed switch KR-1 is still in the closed state and the normally open switch KR-2 is still in the open state. As shown in FIG. 5, when the reset button RESET 8 is in the reset state, the conductive metal piece 66 at the bottom disconnects with the common metal piece 88 in the middle, so that the common metal piece 88 in the middle can be in contact with the conductive metal piece 67 to close the normally open switch KR-2 in the simulated leakage current generation switch.

As shown in FIGS. 3 and 6, the reset switch KR-4 is positioned below the reset/trip mechanism 28, and on the same platform as the solenoid coil L3 above the circuit board. The reset switch KR-4 is coupled to and moves with the reset button RESET 8. The reset switch KR-4 is composed of the elastic sheet metal 72 and the electrical contact 72A. One end of the elastic sheet metal 72 is welded onto the circuit board and connected to the hot line HOT or neutral line NEUTRAL of the input power terminal LINE via the solenoid coil L3. The other end of the elastic sheet metal 72 is suspended in the air and is above the electrical contact 72A to be able to mate with or dissociate with the electrical contact 72A. The electrical contact 72A is welded onto the circuit board. One end of the electrical contact 72A is coupled to the anode of SCR V4. The control electrode of SCR V4 is connected to the control signal pin of the leakage current detection integrated chip IC for leakage current detection and the cathode of the SCR is connected to the neutral line NEUTRAL or the hot line HOT of the power source.

As shown in FIGS. 3 and 5, when the reset button RESET 8 is in the tripped state or the reset state, the reset switch KR-4 is in the open state. As shown in FIG. 4, when the reset button RESET 8 is depressed, the reset switch KR-4 is closed. But when the reset button RESET 8 is released, the reset switch KR-4 turns from the closed state to the open state again. At this time, the normally closed switch KR-1 of the simulated leakage current generation circuit turns from the closed state to the open state, and the normally open switch KR-2 of the simulated leakage current generation switch turns from the open state to the closed state. When the circuit interrupting device is successfully reset, the normal status indicator light LED2 V5 goes off and the power output indicator light V3 lights up.

The reset switch KR-4, the pair of normally closed switch KR-1 and normally open switchs KR-2 form the simulated leakage current generation switch subject to the linkage control of the reset button RESET. The logical relation among the three switches are as follows:

Assuming that the open state of the reset switch is K1, the open state of the normally open switch is K2 and the open state of the normally closed switch is K3. "1" stands for the open state; "0" stands for the closed state; and $1=\overline{0}$;

(1) State 1: After the input power terminal of the leakage current detection and protection circuit is properly wired to the power source in the wall, the reset button is waiting for the state of self detection prior to reset $\overline{K1}=\overline{K2}=K3$;

(2) State 2: When the reset button is pressed down: $K1=\overline{K2}=K3$;

(3) State 3: When the circuit interrupting device is tripped but the reset button has not been released: $\overline{K1}=\overline{K2}=K3$;

(4) State 4: When the reset button is reset and waiting for tripping: $\overline{K1}=K2=\overline{K3}$;

The above four states run in circles. Otherwise, it indicates that the service life of the leakage current detection and protection circuit has come to an end. In that case, the reset button of the circuit interrupting device cannot be reset.

The present invention also provides a manually operated simulated leakage current generation circuit which includes a test switch KR-5. The manually operated simulated leakage generation circuit can manually generate a simulated leakage current to test the service life of the circuit interrupting device by pressing the test button TEST. The test switch KR-5 is coupled to and interacts with the test button TEST. As shown in FIG. 1, the KR-5 has two contacts 46, 47. Contact 46 of the test switch KR-5 is coupled to the neutral line NEUTRAL of the input power terminal LINE via a current-limiting resistor R3. Contact 47 of the test switch KR-5 is coupled to the hot load wire of the output power terminal LOAD of the circuit interrupting device.

When a user decides to test whether the circuit interrupting device is working properly or not, he/she may press down the test button TEST to close contacts 46, 47 of the test switch KR-5, which will generate a simulated leakage current to detect whether the service life of the circuit interrupting device has come to an end. If the leakage current detection and protection circuit fails to work properly and the service life of the circuit interrupting device has come to an end, the normal indicator light LED2 V5 will not light up and the reset button RESET cannot be reset.

For all the conditions described above, the control signal output from pin 5 of the IC must pass through the filtering of anti-interference capacitance C5 parallel-connected between the control electrode of the SCR and the ground to protect against false triggering.

As shown in FIG. 1, in order to increase the service life the circuit interrupting device and to avoid damage due to instantaneous high pressure caused by lightning strike and other reasons to circuit interrupting device, a pair of right-angled triangle or isoceles triangle discharge metal pieces 24C and 25C with sharp ends, used for discharge, are installed close to the input power terminal extended from a pair of input power connecting pieces which are connected to the hot line HOT and neutral line NEUTRAL and input terminal screws 10 and 9 respectively. As shown in FIGS. 7-1, 7-2 and 7-3, the sharp ends of the pair of discharged metal pieces 24C and 25C are placed symmetrically and kept at regular intervals; the distance B of the sharp ends of the two discharged metal pieces 24C and 25C is about half of the distance A from the bases of the two triangles. The angle between the horizontal plane of each of the pair of input power connecting pieces and each of the pair of the discharge metal pieces 24C and 25C is larger than 90°.

In addition, the hot line HOT of the input power terminal is connected to the neutral line NEUTRAL of the input power terminal via the solenoid coil L3 and a metal oxide varistor (MOV).

When the instantaneous high pressure of the hot line and neutral line of input power terminal is caused by lightning strike and other reasons, the air medium between the discharge metal pieces with sharp ends connected in the hot line of the input power terminal and the discharge metal pieces with sharp ends connected in the neutral line of the input power terminal is punctured, so that the air discharge is formed, and most of the high voltage is consumed by the discharge metal pieces and the residual small amount of voltage is consumed by the solenoid coil L3 and metal oxide varistor MOV, so that the leakage current detection and protection circuit is protected. The metal oxide varistor MOV is preferred to have high surge suppression capacity, to allow it to play an important role of preventing electrophoresis.

As shown in FIG. 1, the present invention also has the function of preventing miswiring or reverse wiring. As showing in the Figure, the output load output LOAD of the circuit interrupting device is connected to the user accessible output socket via two pairs of circuit interrupting contacts KR-3-1 and KR-3-2 that are coupled to the reset button RESET. The hot line HOT and the neutral line NEUTRAL of the input power terminal LINE of the circuit interrupting device is also connected to the hot output wire and neutral output wire of the user accessible output socket via two pairs of circuit interrupting contacts KR-3-1 and KR-3-2, also coupled to the reset button RESET. If an installer accidentally connects the power source in the wall with the output load LOAD of the circuit interrupting device, The simulated leakage current generation circuit (containing the normally closed switch KR-1, resistor R4 and the solenoid coil SOL) is not able to automatically generate the simulated leakage current because no current is supplied by the input power terminal to activate the SCR V4 and the solenoid coil L3. The solenoid coil L3 is. not able to form a magnetic field to draw the iron core inward to plunge onto the reset/trip mechanism (as shown in FIG. 6) to trip the circuit interrupting device. The four pairs of circuit interrupting contacts KR-2-1, KR-2-2, KR-3-1 and KR-3-2 are not mating with each other to establish the electrical continuity among the input power terminal, the output load terminal, and the user accessible output socket. The reset button RESET is always in the tripped state and cannot be reset. Also, because there is no power output in the input power terminal LINE of the circuit interrupting device and the output socket, and the normal status indicator light LED2 V5 is not lit. In this circumstance, only the power output indicator light is lit to indicate that there is power output in the load.

Only after the miswiring or reverse wiring condition is reversed, the normal status indicator light LED V5 will light up and the reset button can be depressed. When the reset button is released, the circuit interrupting device can be reset. At this time, the normal status indicator light LED2 V5 will turn off, and the power output indicator light LED1 V3 will be lit to indicate that there is power output.

Figure 2:
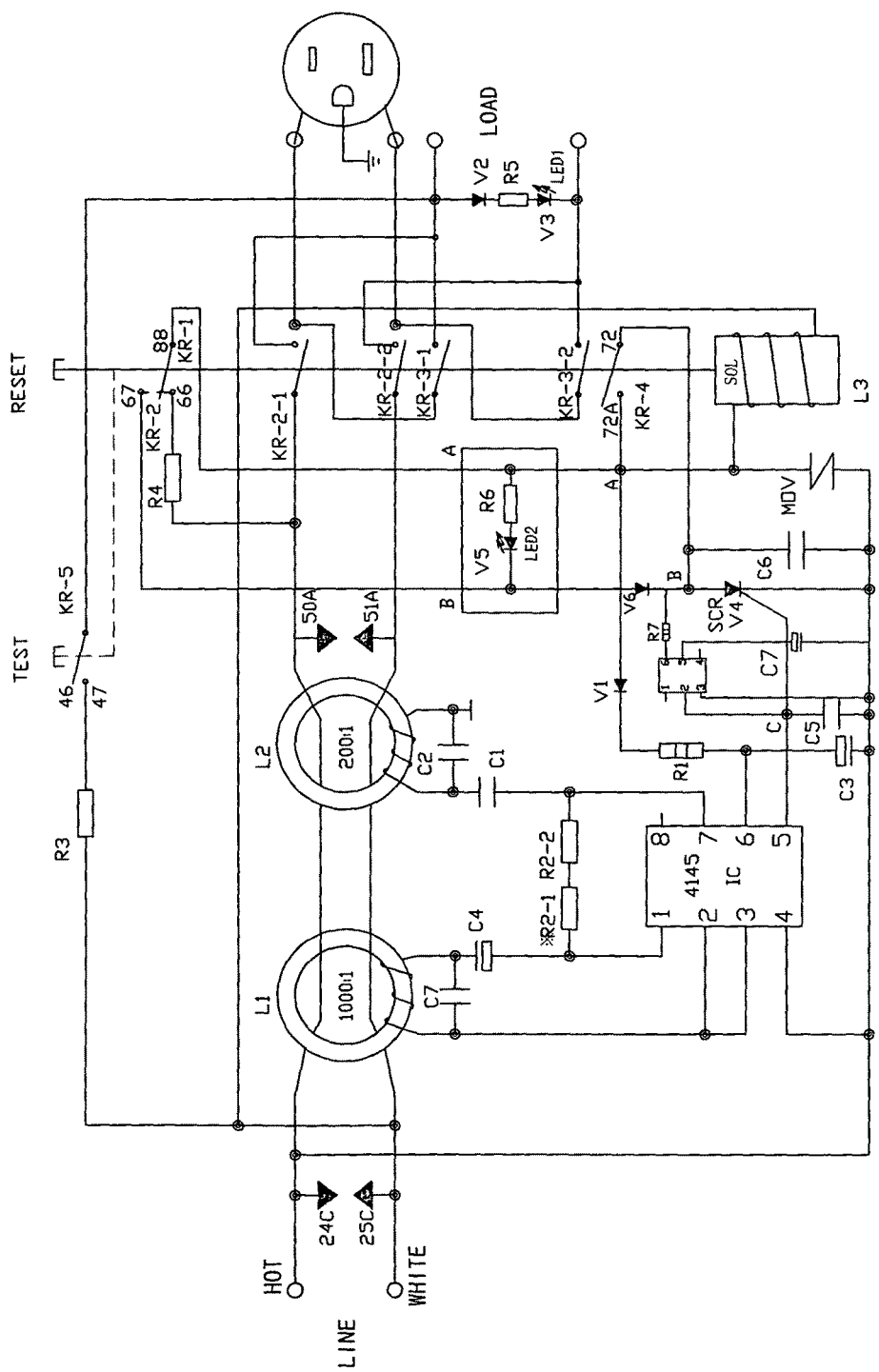
FIG. 2 is a circuit diagram of another embodiment of the leakage current detection and protection circuit of the circuit interrupting device which contains the end-of-life detection and light display functions.

FIG. 2 shows the circuit diagram of a second embodiment of the present invention wherein the leakage current detection and protection circuit contains a timer chip (IC2). Pin 6 of the timer chip is connected to the anode of SCR V4 via a resistor R7. The signal output pin 2 of the timer chip IC2 is connected to the control electrode of SCR V4, which outputs a control signal periodically to make the SCR V4 conductive so as to activate the solenoid coil and trip the circuit interrupting device automatically. After tripping, if the circuit interrupting device is working properly, the normal status indicator light LED2 V5 lights up and the power output indicator light LED1 V3 goes off. That is because the leakage current detection and protection circuit has conducted a self-end-of-life testing. At this time, if the user depresses the reset button RESET, the circuit interrupting device can be reset.

After tripping, if at least one of the key components in the circuit interrupting device is damaged, the self-end-of-life testing cannot be completed, and the normal status indicator light cannot be turned on. At this time, if the user tries to depress the reset button RESET, the reset button cannot be depressed, i.e., the circuit interrupting device cannot be reset. Also, because there is no power output, the power output indicator light LED1 V3 is also not lit, indicating that the service life of the circuit interrupting device is ended and the user should replace the device with a new one.

As shown in FIGS. 1 and 2, optionally, a pair of discharge metal pieces 50A and 51A can be installed at the hot line HOT and the neutral line NEUTRAL after passing through the differential transformers L1 and L2.

In conclusion, the present invention has the following outstanding advantages:

(1) After the input power terminal of circuit interrupting device is properly wired to the input power source in the wall, a simulation leakage current is automatically generated which detects the functions of the key components in the circuit interrupting device.

a. If the components constituting the leakage current detection and protection circuit are working properly and the life of the circuit interrupting device has not come to an end, a normal status indicator light LED2 V5 lights up, indicating that a correct reset system can be established to reset the device. After the reset, a power output indicator light LED1 V3 lights up and the normal status indicator light LED2 V5 is turned off, which shows that the circuit interrupting device is in normal operation.

b. When the leakage current detection and protection circuit is in open circuit or short circuit, and one or more of the components of the device are at the end of service life, the normal status indicator light LED2 V5 does not light up, indicating that the service life of the circuit interrupting device has come to an end. The reset button cannot be reset. Also, there is no power output in the output load end of the circuit interrupting device and on the surface of the output socket of the user accessible load, and the power output indicator light LED1 V3 is not lit.

This will provide sufficient indications to the users to decide whether the service life of the circuit interrupting device has come to an end and the circuit interrupting device should be replaced.

(2) The present invention provides a pair of discharge metal pieces that has the function of protecting the circuit interrupting device from damage caused by instantaneous high surge, such as lightning strike and other reasons.

(3) The present invention provides a manual end-of-life detection and display:

a. When the manual simulated leakage current generation circuit of the leakage current detection and protection circuit work normally and the service life has not come to an end, the normal status indicator light LED2 V5 lights up, showing that the circuit interrupting device may work normally and can be reset. After the reset, the normal status indicator light LED2 V5 will be turned off and the power output indicator light LED1 V3 will be lit.

b. When the manual simulated leakage current generation circuit of the leakage current detection and protection circuit has come to an end, the normal status indicator light LED2 V5 does not light up, showing that the life of the circuit interrupting device has come to an end. The reset button will not be able to reset. Also, there will be no power output in the output load end of the circuit interrupting device and the surface of the output socket of the user accessible load and the power output indicator light LED1 V3 will not be lit.

(4) The present invention provides a circuit interrupting device that has miswiring or reverse wiring capability.

If an installer or electrician connects the power source in the wall to the output load end of the circuit interrupting device by mistake, the present invention does not allow the normal status indicator light LED2 V5 to light up. The reset button of the circuit interrupting device cannot be reset. However, the power output indicator will light up to indicate that the output load has power output.

It is only after the installer properly connects the wire then the reset indicator light LED2 V5 can be lit, reset button can be reset, and the output power terminal of the GFCI has power output. The power output indicator light V3 is lit.

While the GFCI with an automatic end-of-life test has been described in connection with an exemplary embodiment, those skilled in the art will understand that many modifications in light of these teachings are possible, and this application is intended to cover variations thereof. Therefore, the scope of the appended claims should be accorded the broadest interpretation so as to encompass all such modifications.

What is claimed is:

1. A circuit interrupting device having an input power terminal which is coupled to an input power source, an output power terminal which is coupled to an output load, and a user accessible load end which is electrically coupled to a user accessible load socket; said circuit interrupting device comprising a leakage current detection and protection circuit, which comprises a simulated leakage current generation circuit capable of automatically generating a simulated leakage current when said circuit interrupting device is properly wired;

wherein said simulated leakage current generation circuit is coupled to a reset button and comprises a simulated leakage current generation switch, a current-limiting resistor and a solenoid coil;

wherein said simulated leakage current generation switch comprises a normally closed switch and a normally open switch, each containing a conductive metal piece and sharing a common contact piece; wherein said common contact piece is coupled to a hot line or a neutral line of said input power terminal via said solenoid coil;

wherein said conductive metal piece of said normally closed switch is coupled to said hot line or said neutral line of said input power terminal through differential transformers via said current-limiting resistor; wherein said conductive metal piece of said normally open switch is coupled to said neutral line or said hot line of said input power terminal via an anode of a silicon controlled rectifier (SCR);

wherein when said circuit interrupting device is properly wired and in a trip state, said simulated leakage current generation circuit automatically generates said simulated leakage current through an operation of said normally closed switch;

whereby when components of said circuit interrupting device are working properly, a depression of said reset button allows said circuit interrupting device to reset;

whereby when at least one of said components of said circuit interrupting device is damaged or not working properly, a depression of said reset button does not allow said circuit interrupting device to reset, wherein a reset switch is coupled to said reset button; wherein said reset switch is normally open unless for a period when said reset button is depressed by a user;

wherein when said circuit interrupting device is properly wired and in a tripped state, before said reset button is depressed, said normally closed switch is in a closed state while said normally open switch and said reset switch are in an open state;

wherein when said circuit interrupting device is properly wired and said reset button is depressed by a user and before said user releases said reset button, both said normally closed switch and said reset switch are in said closed state, while said normally open switch is in said open state;

wherein when said circuit interrupting device is properly wired and said depression of said reset button causes said circuit interrupting device to trip, before said user releases said reset button, only said normally open switch is in said open state while both said normally closed switch and said reset switch are in said closed state; and wherein when said circuit interrupting device is in a reset state waiting for tripping, said normally open switch is in said closed state, while both of said normally closed switch and said reset switch are in said open state.

2. The circuit interrupting device according to claim 1, wherein said common contact piece comprises an upper contact and a lower contact.

3. The circuit interrupting device according to claim 1, wherein said components of said circuit interrupting device comprise said differential transformers, said solenoid coil, said SCR, and a leakage current detection integrated chip (IC).

4. The circuit interrupting device according to claim 1, wherein said leakage current detection and protection circuit further comprises a normal status indicator light and a power output indicator light;
wherein when said circuit interrupting device is properly wired and at a tripped state, before said reset button is depressed, if said components of said circuit interrupting device are working properly, said normal status indicator light automatically lights up, but said power output indicator is not lit;
wherein at this time, if a user depresses said reset button, said normal status indicator light continues to light, and said power output indicator is still not lit; and
wherein at this time if said user releases said reset button, said normal status indicator light is turned off, and said power output indicator light lights up.

5. The circuit interrupting device according to claim 4, wherein when said circuit interrupting device is reverse wired, said normal status indicator light is not lit, but said power output indicator light lights up.

6. The circuit interrupting device according to claim 5, wherein when said circuit interrupting device is reverse wired, said reset button cannot be depressed.

7. The circuit interrupting device according to claim 4, wherein when said circuit interrupting device is wired and at a tripped state, if neither said normal indicator light nor said power output indicator light is lit, least one of said components of said circuit interrupting device is damaged.

8. The circuit interrupting device according to claim 4, wherein said power output indicator light is located below a light-guiding tube on iii. circuit board and is coupled to a hot and a neutral output power terminals; wherein said light-guiding tube allows said power output indicator light to be shown at said user accessible load socket.

9. The circuit interrupting device according to claim 4, wherein one end of said normal status indicator light is coupled to said anode of said SCR in said leakage detection and protection circuit and the other end of said normal status indicator light is coupled to said common contact piece via a resistor.

10. The circuit interrupting device according to claim 1, wherein one end of said reset switch is coupled to said hot line or said neutral line of said input power terminal via said solenoid coil; wherein the other end of said reset switch is coupled to said anode of said SCR.

11. The circuit interrupting device according to claim 1, wherein a control electrode of said SCR is coupled to a leakage current detection integrated chip (IC) and a anode of said SCR is coupled to said hot or said neutral line of said input power terminal via said reset switch and said solenoid coil; wherein said IC receives a signal from said differential transformers and transmits said signal to said control electrode of said SCR, which relays said signal to said solenoid coil to activate an iron core within said solenoid coil to trip said circuit interrupting device.

12. The circuit interrupting device according to claim 1, further comprising a pair of discharge metal pieces extended from a pair of input power connecting pieces, each being electrically connected to said hot or said neutral line of said input power terminal respectively.

13. The circuit interrupting device according to claim 12, wherein said discharge metal pieces are either right-angled triangular-shaped or isosceles triangular-shaped with sharp ends used for discharge;
wherein said sharp ends of said pair of said discharge metal pieces face, but do not contact with, each other;
whereby during a high voltage surge said pair of said discharge metal pieces cause a discharge of electricity through said sharp ends of said discharge metal pieces to protect said circuit interrupting device from being damaged due to said high voltage surge.

14. The circuit interrupting device according to claim 13, wherein said discharge metal pieces are placed symmetrically opposite one another in the circuit interrupting device, wherein each discharge metal piece comprises a base, wherein a first distance between said facing sharp ends of said discharge metal pieces is about half of a second distance between opposite bases of said discharge metal pieces.

15. The circuit interrupting device according to claim 12, wherein each of said pair of said input power connecting pieces and each of said pair of said discharge metal pieces have an angle greater than 90°.

16. The circuit interrupting device according to claim 1, wherein said hot line of said input power terminal is operationally coupled to said neutral line of said input power terminal through a solenoid coil and a metal oxide varistor (MOV).

17. The circuit interrupting device according to claim 1, further comprising a test switch coupled to a test button; wherein a depression of said test button causes said test switch to close and manually generates a simulated leakage current to test whether said components of said circuit interrupting device are working properly.

18. The circuit interrupting device according to claim 17, wherein one end of said test switch is coupled to said neutral or said hot line of said input power terminal via a simulated leakage current-limiting resistor, and the other end of said test switch is coupled to a hot or a neutral wire of said output load terminal.

19. The circuit interrupting device according to claim 1, further comprising four pairs of circuit interrupting contacts to connecting or disconnecting said input power source to or from said output load and said user accessible output socket; wherein said four pairs of circuit interrupting contacts are coupled to said reset button.

20. The circuit interrupting device according to claim 19, wherein when said circuit interrupting device is properly wired and said reset button is depressed but not released, said reset switch is closed, which activates said solenoid coil and allows an electric current flows from said hot line or neutral line of said input power terminal, through said solenoid coil, said reset switch, said anode of said SCR, and then flows back to said neutral line or said hot line of said input power terminal;
whereby at this time, said normally closed switch is in a closed state, said normally open switch is in an open state, said four pairs of circuit interrupting contacts are disconnected from each other, and a normal indicator lights up;
wherein when said reset button is depressed and released, said reset switch and said normally closed switch are in said open state, while said normally open switch and said four pairs of circuit interrupting contacts are in said closed state; whereby at this time, a normal status indicator light is turned off, and a power output indicator light lights up.

21. The circuit interrupting device according to claim 1, wherein said leakage current detection and protection circuit further comprises a timer chip; wherein one end of said timer chip is coupled to a control electrode of said SCR, which outputs a periodic signal to trip said circuit interrupting device.

22. The circuit interrupting device according to claim 21, wherein when said circuit interrupting device is tripped by said timer chip and said components of said circuit interrupting device are working properly, a normal status indicator light is automatically lit but a power output indicator light on said user accessible output socket is off, indicating that said circuit interrupting device has no power output; wherein at this time, a user needs to depress said reset button to reset said circuit interrupting device;
   wherein when said circuit interrupting device is reset, said normal status indicator light is off and said power output indicator light is lit.

23. The circuit interrupting device according to claim 1, wherein said normally open switch and said normally closed switch are stacked on each other with said normally open switch above said normally closed switch; wherein said conductive metal piece of said normally closed switch is located at the bottom, said common contact piece is located in the middle, and said conductive metal piece of said normally closed switch is located at the bottom; and wherein said normally closed switch and normally open switch are situated close to a tripping mechanism which is located underneath said reset button and has a through hole to receive a direction lock of said reset button.

24. The circuit interrupting device according to claim 23, wherein said tripping mechanism comprises a reset support piece and a tripping device, with said reset support piece situated above said tripping device; wherein said reset support piece has a touch pin which is capable of being extended downward to touch said common contact piece of said normally closed switch and said normally open switch;
   whereby when said reset button is depressed, said touch pin of said reset support piece moves downward with said reset button to rest on said common contact piece to allow said common contact piece to be in touch with said conductive metal piece of said normally closed switch to maintain said normally closed switch at a closed state; and
   whereby when said reset button is in a reset state, said touch pin of said reset support moves upward to separate from said common contact piece to allow said common contact piece to be in contact with said conductive metal piece of said normally open switch so as to close said normally open switch.

25. The circuit interrupting device according to claim 1, wherein said circuit interrupting device is a ground fault circuit interrupter.

26. The circuit interrupting device according to claim 1, wherein said leakage current detection and protection circuit further comprises a normal status indicator light, wherein when said anode of said SCR connects with a cathode of said SCR, said SCR becomes conductive, and said normal status indicator light lights up, and wherein when said anode of said SCR disconnects from said cathode of said SCR, said SCR is not conductive, and said normal indicator light is turned off.

27. A circuit interrupting device having an input power terminal which is coupled to an input power source, an output power terminal which is coupled to an output load, and a user accessible load end which is electrically coupled to a user accessible load socket; said circuit interrupting device comprising a leakage current detection and protection circuit, which comprises a simulated leakage current generation circuit capable of automatically generating a simulated leakage current when said circuit interrupting device is properly wired;
   wherein said simulated leakage current generation circuit is coupled to a reset button and comprises a simulated leakage current generation switch, a current-limiting resistor and a solenoid coil;
   wherein said simulated leakage current generation switch comprises a normally closed switch and a normally open switch, each containing a conductive metal piece and sharing a common contact piece; wherein said common contact piece is coupled to a hot line or a neutral line of said input power terminal via said solenoid coil;
   wherein said conductive metal piece of said normally closed switch is coupled to said hot line or said neutral line of said input power terminal through differential transformers via said current-limiting resistor; wherein said conductive metal piece of said normally open switch is coupled to said neutral line or said hot line of said input power terminal via an anode of a silicon controlled rectifier (SCR);
   wherein said leakage current detection and protection circuit further comprises a timer chip; wherein one end of said timer chip is coupled to a control electrode of said SCR, which outputs a periodic signal to trip said circuit interrupting device;
   wherein when said circuit interrupting device is properly wired and in a trip state, said simulated leakage current generation circuit automatically generates said simulated leakage current through an operation of said normally closed switch;
   whereby when components of said circuit interrupting device are working properly, a depression of said reset button allows said circuit interrupting device to reset;
   whereby when at least one of said components of said circuit interrupting device is damaged or not working properly, a depression of said reset button does not allow said circuit interrupting device to reset; and
   wherein when said circuit interrupting device is tripped by said timer chip and said components of said circuit interrupting device are working properly, a normal status indicator light is automatically lit but a power output indicator light on said user accessible output socket is off, indicating that said circuit interrupting device has no power output; wherein at this time, a user needs to depress said reset button to reset said circuit interrupting device; wherein when said circuit interrupting device is reset, said normal status indicator light is off and said power output indicator light is lit.

28. A circuit interrupting device having an input power terminal which is coupled to an input power source, an output power terminal which is coupled to an output load, and a user accessible load end which is electrically coupled to a user accessible load socket; said circuit interrupting device comprising a leakage current detection and protection circuit, which comprises a simulated leakage current generation circuit capable of automatically generating a simulated leakage current when said circuit interrupting device is properly wired;
   wherein said simulated leakage current generation circuit is coupled to a reset button and comprises a simulated leakage current generation switch, a current-limiting resistor and a solenoid coil;

wherein said simulated leakage current generation switch comprises a normally closed switch and a normally open switch, each containing a conductive metal piece and sharing a common contact piece; wherein said common contact piece is coupled to a hot line or a neutral line of said input power terminal via said solenoid coil;

wherein said conductive metal piece of said normally closed switch is coupled to said hot line or said neutral line of said input power terminal through differential transformers via said current-limiting resistor; wherein said conductive metal piece of said normally open switch is coupled to said neutral line or said hot line of said input power terminal via an anode of a silicon controlled rectifier (SCR);

wherein when said circuit interrupting device is properly wired and in a trip state, said simulated leakage current generation circuit automatically generates said simulated leakage current through an operation of said normally closed switch;

whereby when components of said circuit interrupting device are working properly, a depression of said reset button allows said circuit interrupting device to reset;

whereby when at least one of said components of said circuit interrupting device is damaged or not working properly, a depression of said reset button does not allow said circuit interrupting device to reset;

wherein said normally open switch and said normally closed switch are stacked on each other with said normally open switch above said normally closed switch;

wherein said conductive metal piece of said normally closed switch is located at the bottom, said common contact piece is located in the middle, and said conductive metal piece of said normally closed switch is located at the bottom; wherein said normally closed switch and normally open switch are situated close to a tripping mechanism which is located underneath said reset button and has a through hole to receive a direction lock of said reset button;

wherein said tripping mechanism comprises a reset support piece and a tripping device, with said reset support piece situated above said tripping device; wherein said reset support piece has a touch pin which is capable of being extended downward to touch said common contact piece of said normally closed switch and said normally open switch;

whereby when said reset button is depressed, said touch pin of said reset support piece moves downward with said reset button to rest on said common contact piece to allow said common contact piece to be in touch with said conductive metal piece of said normally closed switch to maintain said normally closed switch at a closed state; and whereby when said reset button is in a reset state, said touch pin of said reset support moves upward to separate from said common contact piece to enable said common contact piece to be in contact with said conductive metal piece of said normally open switch so as to close said normally open switch.

* * * * *